US012123490B2

United States Patent
Mouly

(10) Patent No.: US 12,123,490 B2
(45) Date of Patent: Oct. 22, 2024

(54) PLANET CARRIER FOR A MECHANICAL GEARBOX ON AN AIRCRAFT TURBOMACHINE

(71) Applicant: SAFRAN TRANSMISSION SYSTEMS, Colombes (FR)

(72) Inventor: Guillaume Pierre Mouly, Moissy-Cramayel (FR)

(73) Assignee: Safran Transmission Systems, Colombes (FR)

( * ) Notice: Subject to any disclaimer, the term of this patent is extended or adjusted under 35 U.S.C. 154(b) by 0 days.

(21) Appl. No.: 18/332,609

(22) Filed: Jun. 9, 2023

(65) Prior Publication Data

US 2023/0400093 A1    Dec. 14, 2023

(30) Foreign Application Priority Data

Jun. 10, 2022 (FR) ........................................ 2205587

(51) Int. Cl.
 *F16H 57/08* (2006.01)
 *F02C 6/20* (2006.01)

(52) U.S. Cl.
 CPC ............. *F16H 57/082* (2013.01); *F02C 6/20* (2013.01); *F05D 2220/323* (2013.01); *F05D 2260/40311* (2013.01); *F16H 2057/085* (2013.01)

(58) Field of Classification Search
 CPC ............. F16H 57/082; F16H 2057/085; F05D 2220/323; F05D 2260/40311
 USPC .................................................. 475/331, 348
 See application file for complete search history.

(56) References Cited

U.S. PATENT DOCUMENTS

| 5,102,379 A * | 4/1992 | Pagluica | F16H 57/082 |
|---|---|---|---|
| | | | 475/159 |
| 9,982,771 B2 * | 5/2018 | Muldoon | F16H 1/28 |
| 11,578,610 B2 * | 2/2023 | Hrubec | F16H 57/082 |
| 2010/0105515 A1 * | 4/2010 | Goleski | F16H 57/082 |
| | | | 475/341 |
| 2010/0292044 A1 | 11/2010 | Lahtinen et al. | |
| 2013/0184120 A1 | 7/2013 | Altamura et al. | |

(Continued)

FOREIGN PATENT DOCUMENTS

| DE | 4029373 A1 * | 3/1992 |
|---|---|---|
| FR | 2 987 416 A1 | 8/2013 |

(Continued)

OTHER PUBLICATIONS

France Search Report and Written Opinion mailed Jan. 2, 2023, issued in Application No. FR2205587, filed Jun. 10, 2022, 8 pages.

*Primary Examiner* — Roger L Pang
(74) *Attorney, Agent, or Firm* — Christensen O'Connor Johnson Kindness PLLC

(57) ABSTRACT

A planet carrier for a mechanical gearbox of a turbomachine, in particular for an aircraft, the planet carrier being formed in a single piece and comprising two annular flasks connected by material bridges and together defining housings configured to receive planet gears, the flasks comprising orifices for mounting the planet gears which are oriented axially and which open into the housings. One of the flasks can include at least one thinning around its orifices, the at least one thinning defining a minimum thickness of material in the axial direction which is less than a minimum thickness of the other flask around each of its orifices.

15 Claims, 5 Drawing Sheets

(56) References Cited

U.S. PATENT DOCUMENTS

2015/0192200 A1* 7/2015 Rittmeyer .............. H02K 7/003
 475/331
2018/0051798 A1 2/2018 Klein-Hitpass

FOREIGN PATENT DOCUMENTS

| | | |
|---|---|---|
| FR | 3 011 901 A1 | 4/2015 |
| FR | 3 041 054 A1 | 3/2017 |
| FR | 3 058 493 A1 | 5/2018 |
| WO | 2010/092263 A1 | 8/2010 |

* cited by examiner

PLANET CARRIER FOR A MECHANICAL GEARBOX ON AN AIRCRAFT TURBOMACHINE

CROSS-REFERENCE TO RELATED APPLICATION

This application claims priority to FR 2205587, filed Jun. 10, 2022, the disclosure of which is hereby expressly incorporated by reference herein in its entirety.

TECHNICAL FIELD

The present disclosure relates to the field of the mechanical gearboxes for turbomachines, in particular for an aircraft, and in particular to the gearboxes equipped with dual-stage gearing planet gears.

BACKGROUND

The prior art comprises in particular the documents WO-A1-2010/092263, FR-A1-2 987 416, FR-A1-3 011 901, FR-A1-3 041 054, FR-A1-3 058 493, US-A1-2010/292044, US-A1-2018/051798 and US-A1-2013/184120.

The role of a mechanical gearbox is to modify the speed and torque ratio between the input axle and the output axle of a mechanical system.

The new generations of double-flow turbomachines, in particular those with a high bypass ratio, comprise a mechanical gearbox to drive the shaft of a fan. The usual purpose of the gearbox is to convert the rotational speed referred to as high speed of the shaft of a power turbine into a slower rotational speed for the shaft driving the fan.

Such a gearbox comprises a central pinion, referred to as sun gear, a ring gear and pinions referred to as planet gears, which are engaged between the sun gear and the ring gear. The planet gears are held by a frame referred to as planet carrier. The sun gear, the ring gear and the planet carrier are planetary because their axes of revolution coincide with the longitudinal axis X of the turbomachine. The planet gears each have a different axis of revolution and are equally distributed on the same operating diameter around the axis of the planetary. These axes are parallel to the longitudinal axis X.

There are several gearbox architectures. In the prior art of the double-flow turbomachines, the gearboxes are of the planetary or epicyclic type. In other similar applications, there are architectures referred to as differential or "compound":

in a planetary gearbox, the planet carrier is stationary and the ring gear is the output shaft of the device which rotates in the opposite orientation of the sun gear;
in an epicyclic gearbox, the ring gear is stationary and the planet carrier is the output shaft of the device which rotates in the same orientation as the sun gear; and
on a compound gearbox, no element is attached in rotation—the ring gear rotates in the opposite orientation of the sun gear and of the planet carrier.

The gearboxes can consist of one or more gearing stages. This gearing is ensured in different ways such as by contact, friction, or magnetic field.

In the present application, "stage" or "toothing" means a series of gearing teeth with a series of complementary teeth. A toothing can be internal or external.

A planet gear may comprise one or two gearing stages. A single-stage planet gear comprises a toothing that can be straight, helical or herringbone, and whose teeth are located on a same diameter. This toothing cooperates with both the sun gear and the ring gear.

A double-stage planet gear comprises two toothings or two series of teeth that are located on different diameters. A first toothing cooperates with the sun gear and a second toothing cooperates with the ring gear.

There are two planet carrier technologies: the monobloc planet carriers and the planet carriers comprising a cage and a cage carrier connected together by flexible connections.

The present disclosure relates to the planet carriers of the monobloc type. A planet carrier of this type comprises a cage formed in one piece with a shaft portion.

The cage comprises two annular flasks connected together by bridges of material, these material bridges defining, between them and with the flasks, housings for receiving the planet gears. The flasks comprise orifices for mounting the axial ends of guide bearings guiding the planet gears. These orifices are commonly referred to as "receptacles".

One of the problems with a gearbox of this type is the transmission of forces during operation and the risk of misalignment of the planet gears. In a monobloc planet carrier, the forces applied to the planet gears are transmitted by the bearings to the flasks of the planet carrier. The configuration of the planet carrier does not allow these forces to be taken up in a centred manner, due to the presence of the ring gear. The geometry of the planet carrier must therefore be produced to balance the forces. However, the planet carrier is a complex piece with little space available to allow for this particular geometry.

The disclosure provides a simple, effective, and economical solution to this problem.

SUMMARY

The disclosure relates to a planet carrier for a mechanical gearbox of a turbomachine, in particular for an aircraft, this planet carrier having a main axis and comprising a cage formed in a single piece with a shaft portion centred on the axis, the cage comprising two annular flasks extending around the axis, one of which, referred to as first flask, is connected to the shaft portion, and the other, referred to as second flask, is connected to the first flask by bridges of material distributed around the axis, the bridges of material defining between them and with the flasks, housings configured for or configured to receiving planet gears, the first and second flasks respectively comprising first and second orifices for mounting the planet gears which are oriented axially and which open into the housings, wherein the first flask comprises a thinning around each of the first orifices, the thinning defining a minimum thickness of material in the axial direction which is less than a minimum thickness of the second flask around each of the second orifices.

The disclosure thus proposes to locally reduce the thickness of the first flask, around each of its orifices, so as to increase its flexibility (or reduce its stiffness). The stiffness of the first flask around its orifices is therefore less than the stiffness of the second flask around the orifices of this second flask. The thinning and therefore the softening are carried out on the first flask and not on the second flask, i.e. on the side where the forces are taken up by the shaft portion of the planet carrier. Advantageously, the flexibility of the first flask is compensated for by the rigidity of the shaft portion so that the overall stiffness at the level of both sides of each of the bearings are substantially identical and therefore balanced.

The thinning can be carried out by machining the first flask, for example.

To achieve an optimum stiffness, the thickness around each of the orifices in the first flask must be as small as possible, but a minimum of material is required to ensure the transmission of the forces that pass through and to limit the stresses.

This disclosure is compatible:
with a single-stage or double-stage gearbox;
with a planetary, epicyclic or differential gearbox;
with a monobloc planet carrier;
with all types of toothing (straight, helical or herringbone);
with hydrodynamic and/or rolling element bearings.

The planet carrier according to the disclosure may comprise one or more of the following characteristics, taken alone from each other, or in combination with each other:
the thinning comprises a gorge extending around each of the first orifices,
the thinning comprises two or three coaxial gorges extending around each of the first orifices,
the first flask comprises a first face located on the side of the shaft portion, and a second face located on the side of the second flask, at least the first face and/or the second face comprising at least one gorge; it is thus understood that the gorges extending around an orifice can be located on one of the faces or both faces of the first flask,
the gorges formed on the first face and/or the second face have different diameters,
one of the first and second faces comprises two gorges which extend around each other and have diameters D1 and D3 respectively, and/or the other of the first and second faces comprises a gorge with a diameter D2 between D1 and D3; the gorges with diameters D1, D2 and D3 thus extend around the same orifice,
the or each gorge has a generally curved or semi-circular cross-sectional shape,
the thinning reduces a thickness of the first flask by at least 50%,
each of the first orifices has an internal diameter that is smaller than the internal diameter of each of the second orifices,
the first flask is double-walled and comprises two parallel walls, a first wall and a second wall respectively, which are connected together by an annular web at the level of their external peripheries, the first wall being connected by the bridges of material to the second flask and comprising the thinning, and the second wall being connected to the shaft portion,
the shaft portion comprises external toothing.

The present disclosure also relates to a mechanical gearbox for an aircraft turbomachine, this gearbox comprising a planet carrier as described above, planet gears which are housed in the housings and which are guided by bearings whose axial ends are engaged in the first and second orifices, and a sun gear which is housed in the cage and which is meshed with the planet gears.

The present disclosure also relates to an aircraft turbomachine comprising a planet carrier or a gearbox as described above.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth above in connection with the appended drawings, where like numerals reference like elements, are intended as a description of various embodiments of the present disclosure and are not intended to represent the only embodiments. Each embodiment described in this disclosure is provided merely as an example or illustration and should not be construed as preferred or advantageous over other embodiments. The illustrative examples provided herein are not intended to be exhaustive or to limit the disclosure to the precise forms disclosed.

Figure 1:
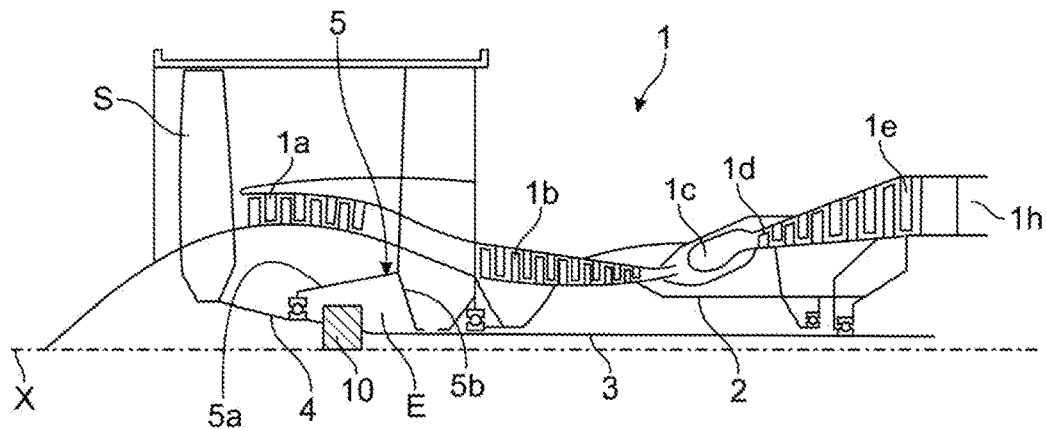
FIG. 1 is a schematic axial sectional view of an aircraft turbomachine.

FIG. 1 shows a turbomachine 1 which conventionally comprises an axis of rotation X, a fan S, a low-pressure compressor 1a, a high-pressure compressor 1b, an annular combustion chamber 1c, a high-pressure turbine 1d, a low-pressure turbine 1e and an exhaust nozzle 1h. The high-pressure compressor 1b and the high-pressure turbine 1d are connected by a high-pressure shaft 2 and together they form a high-pressure (HP) body. The low-pressure compressor 1a and the low-pressure turbine 1e are connected by a low-pressure shaft 3 and together they form a low-pressure (LP) body.

The fan S is driven by a fan shaft 4 which is driven to the LP shaft 3 by means of a gearbox 6. This gearbox 6 is generally of the planetary or epicyclic type.

The following description relates to a gearbox of the planetary type in which the ring gear is movable in rotation.

The gearbox 6 is positioned in the upstream part of the turbomachine. A stationary structure comprising schematically, here, an upstream part 5a and a downstream part 5b which makes up the engine casing or stator 5 is arranged so as to form an enclosure E surrounding the gearbox 6. This enclosure E is closed upstream by seals at the level of a bearing allowing the passage of the fan shaft 4, and downstream by seals at the level of the passage of the LP shaft 3.

Figure 2:
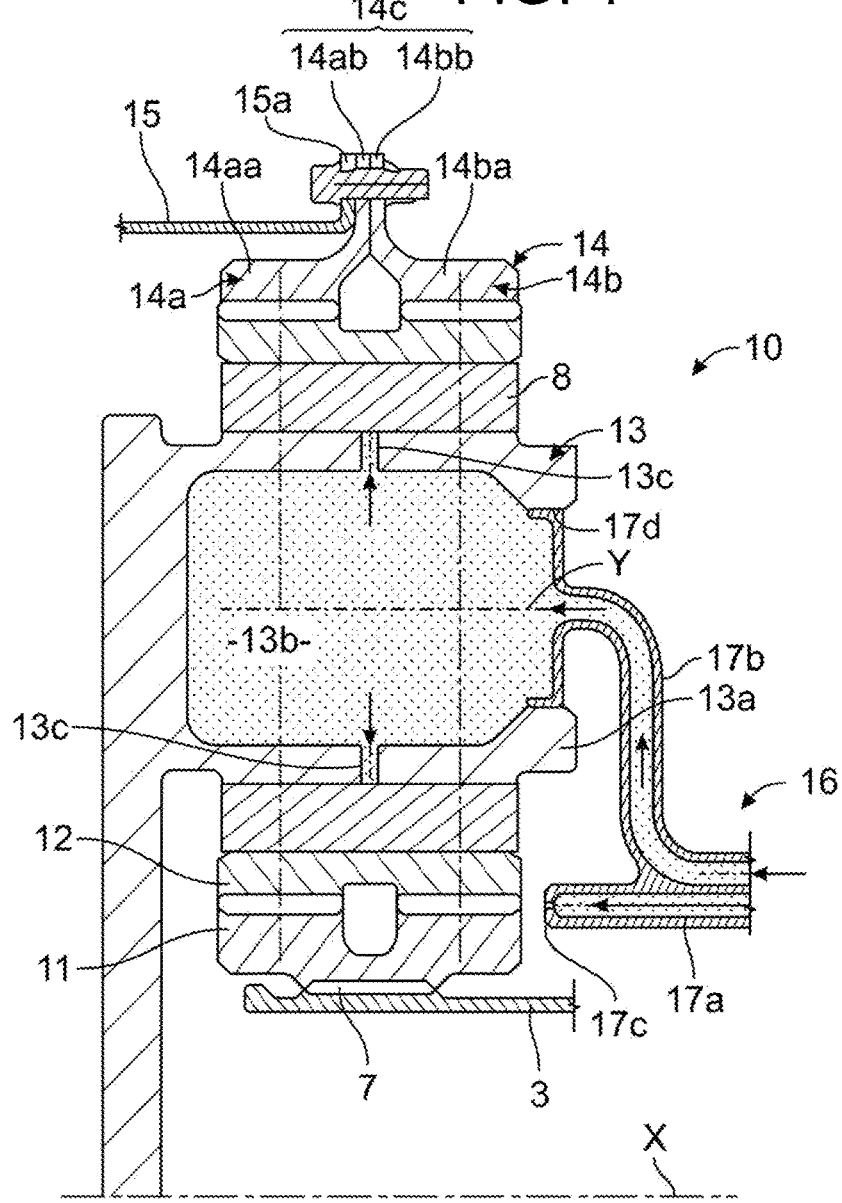
FIG. 2 is a partial view in axial cross-section of a mechanical gearbox.

FIG. 2 shows a gearbox 6 which can take the form of different architectures depending on whether certain pieces are stationary or in rotation. The input of the gearbox 6 is connected to the LP shaft 3, for example by means of internal splines 7a. Thus the LP shaft 3 drives a planetary pinion referred to as the sun gear 7. Classically, the sun gear 7, whose axis of rotation is coincident with that of the turbomachine X, drives a series of pinions referred to as planet gears 8, which are equally distributed on the same diameter around the axis of rotation X. This diameter is equal to twice the operating centre distance between the sun gear 7 and the planet gears 8. The number of planet gears 8 is generally defined between three and seven for this type of application.

The assembly of the planet gears 8 is maintained by a frame referred to as planet carrier Each planet gear 8 rotates around its own axis Y, and meshes with the ring gear 9:

in this planetary configuration, the assembly of the planet gears 8 is held by a planet carrier 10 which is attached to the engine casing or stator 5. Each planet gear drives the ring gear which is fitted to the fan shaft 4 via a ring gear carrier 12.

Each planet gear 8 is mounted free in rotation by means of a bearing 11, for example of the rolling or hydrodynamic bearing type. Each bearing 11 is mounted on one of the axles of the planet carrier 10 and all axles are positioned relative to each other using one or more structural frame 10a of the planet carrier 10. There are a number of axles 10b and bearings 11 equal to the number of planet gears. For reasons of operation, assembly, manufacture, inspection, repair or replacement, the axles 10b and the frame 10a can be separated into several pieces.

For the same reasons mentioned above, the toothing of a gearbox can be separated into several propellers each with a median plane P. In the example shown, the ring gear is split into two half-ring gears:

an upstream half-ring gear 9a consisting of a rim 9aa and an attachment half-flange 9ab. On the rim 9aa there is the upstream propeller of the toothing of the gearbox. This upstream propeller meshes with that of the planet gear 8 which meshes with that of the sun gear 7.

a downstream half-ring gear 9b consisting of a rim 9ba and an attachment half-flange 9bb. On the rim 9ba is the downstream propeller of the toothing of the gearbox. This downstream propeller meshes with that of the planet gear 8 which meshes with that of the sun gear 7.

The attachment half-flange 9ab of the upstream ring gear 9a and the attachment half-flange 9bb of the downstream ring gear 9b form the attachment flange 9c of the ring gear. The ring gear 9 is attached to a ring gear carrier by assembling the attachment flange 9c of the ring gear and the attachment flange 12a of the ring gear carrier by means of a bolted mounting, for example.

The arrows in FIG. 2 depict the conveying of the oil in the gearbox 6. The oil enters the gearbox 6 from the stator part 5 into a dispenser 13 by different means which will not be specified in this view because they are specific to one or more types of architecture. The dispenser is separated into 2 parts, each of which is generally repeated with the same number of planet gears. The function of the injectors 13a is to lubricate the toothings and the function of the arms 13b is to lubricate the bearings. The oil is fed towards the injector 13a and exits through the end 13c to lubricate the toothings. The oil is also fed towards the arm 13b and circulates via the supply mouth 13d of the bearing. The oil then circulates through the axle into one or more buffer areas 10c and exit out through the orifices 10d in order to lubricate the bearings of the planet gears.

Figure 3:
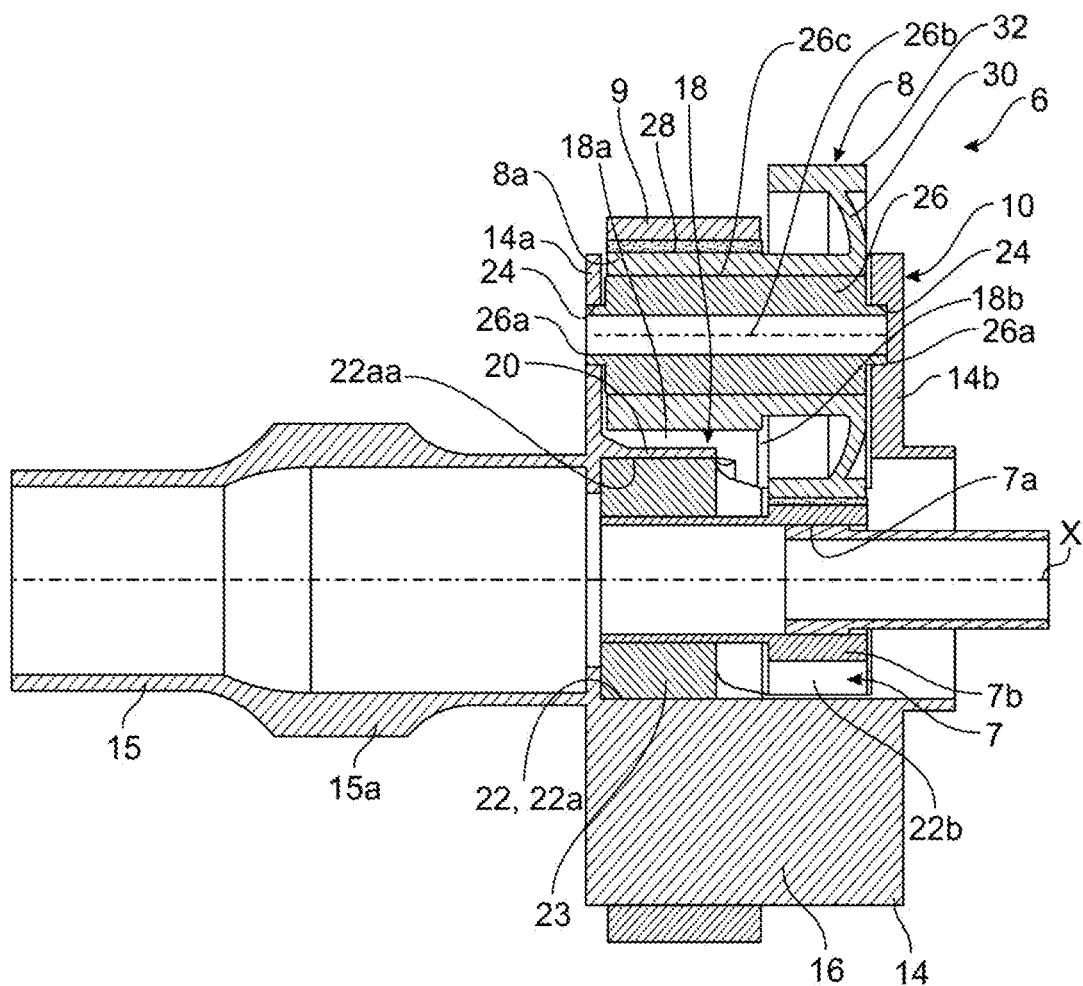
FIG. 3 is an axial sectional view of a mechanical gearbox equipped with double-meshing stage planet gears, and illustrates the prior art.
Figure 4:
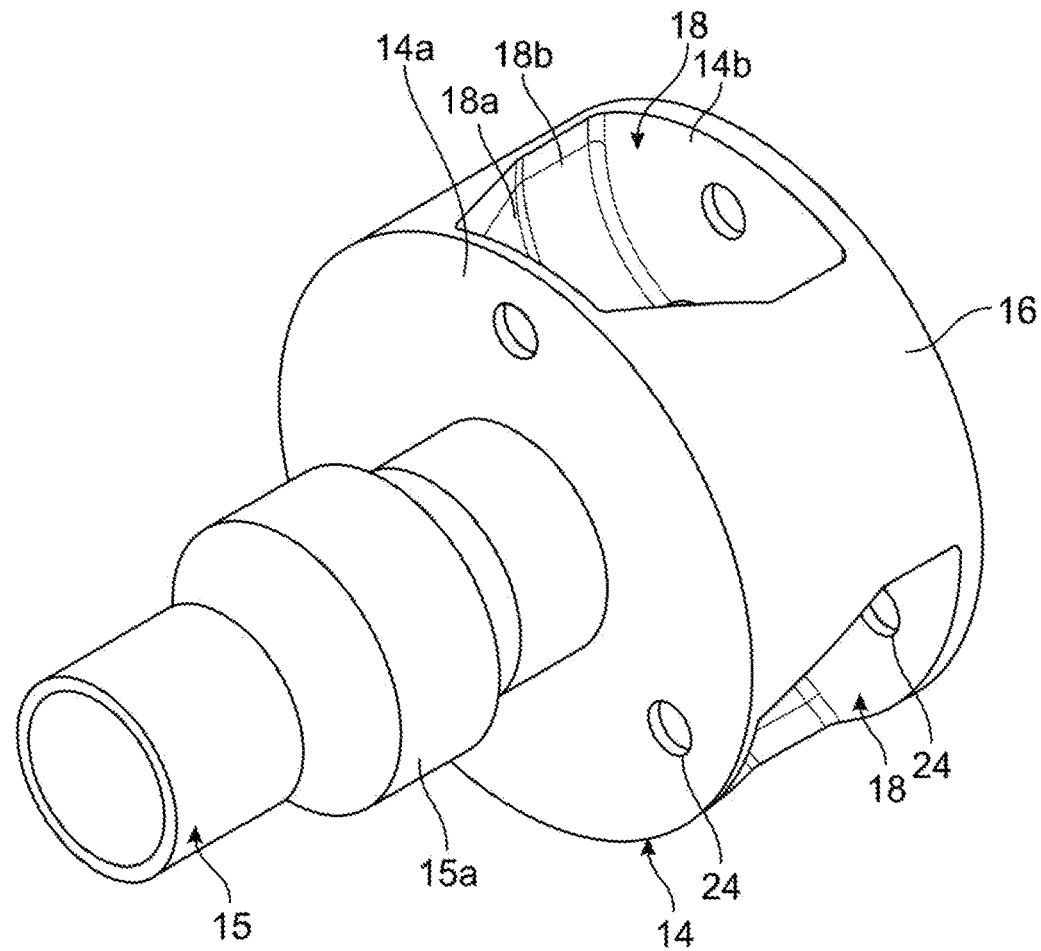
FIG. 4 is a perspective view of the planet carrier of the gearbox shown in FIG. 3, and illustrates the prior art.

FIGS. 3 and 4 show an aircraft turbomachine gearbox 6 in the prior art.

The gearbox 6 comprises a planet carrier 10 which is configured to be mobile in rotation about the axis X and which is of the monobloc type, i.e. formed in one single piece.

This planet carrier 10 comprises a cage 14 and a shaft portion 15.

The shaft portion 15 is generally tubular and elongated along the axis X and comprises a free longitudinal end, shown here on the left in the drawings, and an opposite longitudinal end for connecting to the cage 14.

The shaft portion 15 comprises an external toothing 15a for meshing with, for example, a fan.

The cage 14 comprises two annular flasks 14a, 14b which are parallel and spaced apart and extend perpendicular to the axis X. The flasks 14a, 14b are generally circular in shape and are centred on the axis X.

The flask 14a, referred to as first flask, on the left of the drawing, is connected to the shaft portion 15. The other flask 14b is referred to as second flask.

The flasks 14a, 14b are connected to each other by material bridges 16 which define between them and with the flasks, housings 18 configured to receive the planet gears 8. The housings 18 open radially outwardly at the external periphery of the cage 14, and also open radially inwardly through an internal tubular wall 20 of the cage 14. The material bridges 16 can be solid or partially recessed.

The wall 20 extends around the axis X from the first flask 14a towards the second flask 14b. Here, it extends substantially in the axial extension of the shaft portion 15. This wall 20 delimits internally a space 22 for housing the sun gear 7.

This space 22 comprises two adjacent parts. The first part 22a is surrounded by the wall which comprises an internal cylindrical surface 22a for mounting a bearing 23 for guiding an end of the sun gear 7. The second part 22b, located at the level of the openings of the housings 18, receives the opposite end of the sun gear 7, which comprises an external toothing 7b for meshing with the planet gears 8. The sun gear 7 further comprises an internal toothing 7a for coupling to a shaft, for example, of turbine.

The housings 18 each comprise a first part 18a which is located on the side of the first flask 14a, and a second part 18b which is located on the side of the second flask 14b. The housings 18 open at the external periphery of the cage 14, at the level of its two parts 18a, 18b, and at the internal periphery of the cage 14, at the level of the second parts 18b only.

The flasks 14a, 14b comprise aligned orifices 24 for mounting the planet gears 8 and in particular plain bearings 26 of these planet gears 8. Each bearing 26 has a generally cylindrical shape which extends parallel to the axis X and whose longitudinal ends comprise extensions 26a housed in the orifices 24 forming seats.

In a known manner, each bearing 26 may comprise an internal oil circulation bore 26b which generally communicates with oil feed conduits to the external cylindrical surface 26c of the bearing in order to form a film of oil on this surface 26c.

The planet gears 8 are here of the double stage gearing type and each comprise a tubular body 8a equipped with a first external toothing 28 and connected by a web 30 to a second external toothing 32.

The toothings 28, 32 are arranged next to each other and more particularly are located respectively in two planes perpendicular to the axis X.

The first toothing 28, shown on the left in the drawings, is located on the same side as the first flask 14a and therefore at the level of the first part 18a of the housing. As can be seen in FIG. 3, this toothing 28 is in mesh with the ring gear 9.

The second toothing 32, on the right of the drawings, is located on the side of the second flask 14b and therefore at the level of the second part 18b of the housing. As can be seen in FIG. 3, this toothing 32 is meshed with the toothing 7b of the sun gear 7.

As can be seen in FIG. 3, the material bridges 16 extend radially, between the housings 18, from the wall 20 and the internal periphery of the flasks 14a, 14b to the external periphery of the flasks.

In this type of planet carrier, it is important to ensure that the operating forces are taken up between the turbine and the planet carrier. The forces first pass through the shaft portion 15 and then reach the upstream flask 14a. They then pass through the upstream flask 14a to pass through the bearings 26 and the planet gears 8. This transmission of the forces by means of one of the flasks risks causing a tilting of the planet gears 8 and therefore misalignments between their toothings 28, 32 and those of the sun gear 7 and of the ring gear 9.

Figure 5:
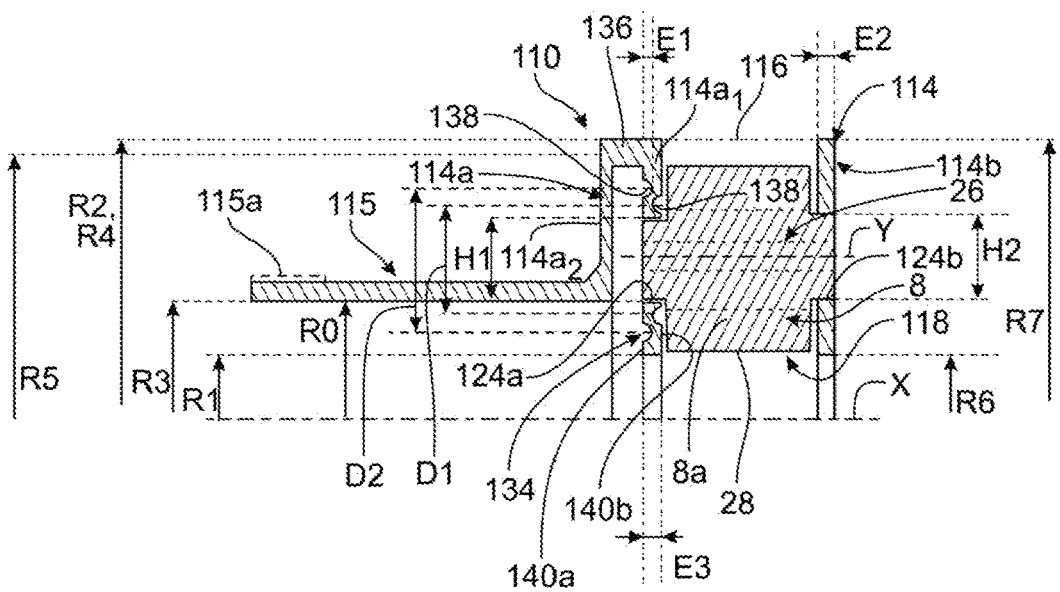
FIG. 5 is a partial view of an axial cross-section of a planet carrier and a mechanical gearbox according to one embodiment of the disclosure.

The disclosure proposes to remedy this problem by means of a planet carrier, a first embodiment of which is illustrated in FIG. 5 and variants of which are illustrated in FIGS. 7, 8a and 8b.

The following description relates to the characteristics of the planet carrier according to the disclosure. This planet carrier is designed to be mounted in a mechanical gearbox of the type mentioned above, which will not be described in detail below. The above description in relation to FIGS. 1 to 4 can thus be used to describe a gearbox comprising a planet carrier according to the disclosure.

The planet carrier 110 shown in FIG. 5 is of the monobloc type, i.e. formed in a single-piece.

This planet carrier 110 comprises a cage 114 and a shaft portion 115.

The shaft portion 115 is generally tubular and elongated along the axis X and comprises a free longitudinal end, shown here on the left in the drawings, and an opposite longitudinal end for connecting to the cage 114.

The shaft portion 115 comprises an external gearing toothing 115a, for example with a fan shaft.

The cage 114 comprises two annular flasks 114a, 114b which are parallel and spaced apart and extend perpendicular to the axis X. The flasks 114a, 114b are generally circular in shape and are centred on the axis X.

The flask 114a, referred to as first flask, on the left of the drawing, is connected to the shaft portion 115. The other flask 114b is referred to as second flask.

The flasks 114a, 114b are connected to each other by material bridges 116 which define between them and with the flasks, housings 118 configured to receive the planet gears 8. The housings 118 open radially outwards at the external periphery of the cage 114, and also open radially inwards. The material bridges 116 can be solid or partially recessed.

The flasks 114a, 114b comprise aligned orifices 124a, 124b for mounting the planet gears 8 and in particular the plain bearings 26 of these planet gears 8. Each bearing 26 is generally cylindrical in shape, extending parallel to the axis X, with the longitudinal ends comprising extensions 26a housed in the orifices 124 forming seats or receptacles. The orifices 124a in the first flask 14a are referred to as first orifices, and the orifices 124b in the second flask 14b are referred to as second orifices.

In a known way, each bearing 26 can comprise an internal oil circulation bore as mentioned above.

The planet gears 8 are here of the single-stage gear type and each comprise a tubular body 8a equipped with an external toothing 28 intended to be meshed with the ring gear (not shown) and the sun gear (also not shown).

According to the disclosure, the first flask 114a comprises at least one thinning 134 around each of the first orifices 124a. This thinning 134 defines a minimum thickness E1 of material in the axial direction which is less than a minimum thickness E2 of the second flask 114b around each of the second orifices 114b.

In the example shown, which is not limiting, the first flask 114a is double-walled and comprises two parallel walls 114a1, 114a2, respectively a first wall 114a1 and a second wall 114a2 which are connected together by an annular web 136 at the level of their external peripheries. The first wall 114a1 is connected by the material bridges 116 to the second flask 114b and comprises the thinning 134. The second wall 114a2 is connected to the shaft portion 115.

Note:
R0 is the internal diameter of the shaft portion 115;
R1 is the internal diameter of the first wall 114a1 or of the first flask 114a;
R2 is the external diameter of the first wall 114a1 or of the first flask 114a;
R3 is the internal diameter of the second wall 114a2;
R4 is the external diameter of the second wall 114a2;
R5 is the average or external diameter of the shell 136;
R6 is the internal diameter of the flask 114b; and
R7 is the external diameter of the flask 114b.
The foregoing radii are measured in relation to the axis X.
Wherein:
R2, R4, R5 and R7 are close, similar, or identical;
R1 and R6 can be close, similar, or identical;
R0 and R3 can be close, similar, or identical;
R1 and R6 can be close, similar, or identical;
R1 can be less than R3 and/or R0; and
R6 can be less than R3 and/or R0.

The orifices 124a and 124b have diameters H1 and H2, respectively. In the example shown, these diameters are close, similar, or identical. These diameters are measured in relation to the axis Y.

In an embodiment of the disclosure, the thinning 134 comprises at least one gorge 138, and preferably two or three coaxial gorges, extending around each of the orifices 124a.

The first flask 114a, and in particular its wall 114a2, comprises a first face 140a located on the side of the shaft portion, and a second face 140b located on the side of the second flask 114b.

In the example shown, the face 140a comprises a gorge 138 of diameter D2 and the face 140b comprises a gorge 138 of diameter D1. The diameters D1 and D2 are different and D1 in particular is smaller than D2 here.

Each gorge 138 is generally curved or semi-circular in cross-section.

Each gorge 138 generates a reduction in thickness of the first flask 114a, and in particular of the wall 114a1, which is preferably greater than or equal to 50%. In other words, $E1 \leq 0.5 \cdot E3$, E3 being the average thickness of the rest of the flask 114a. Similarly, preferably $E1 \leq 0.5 \cdot E2$.

The formation, for example by machining, of the gorges 138 on the two faces 140a, 140b of the wall 114a1 and the fact that they have different diameters D1, D2 induces an S or bellows shape in cross-section of the part of the flask 114a which extends around each orifice 124a.

Figure 6:
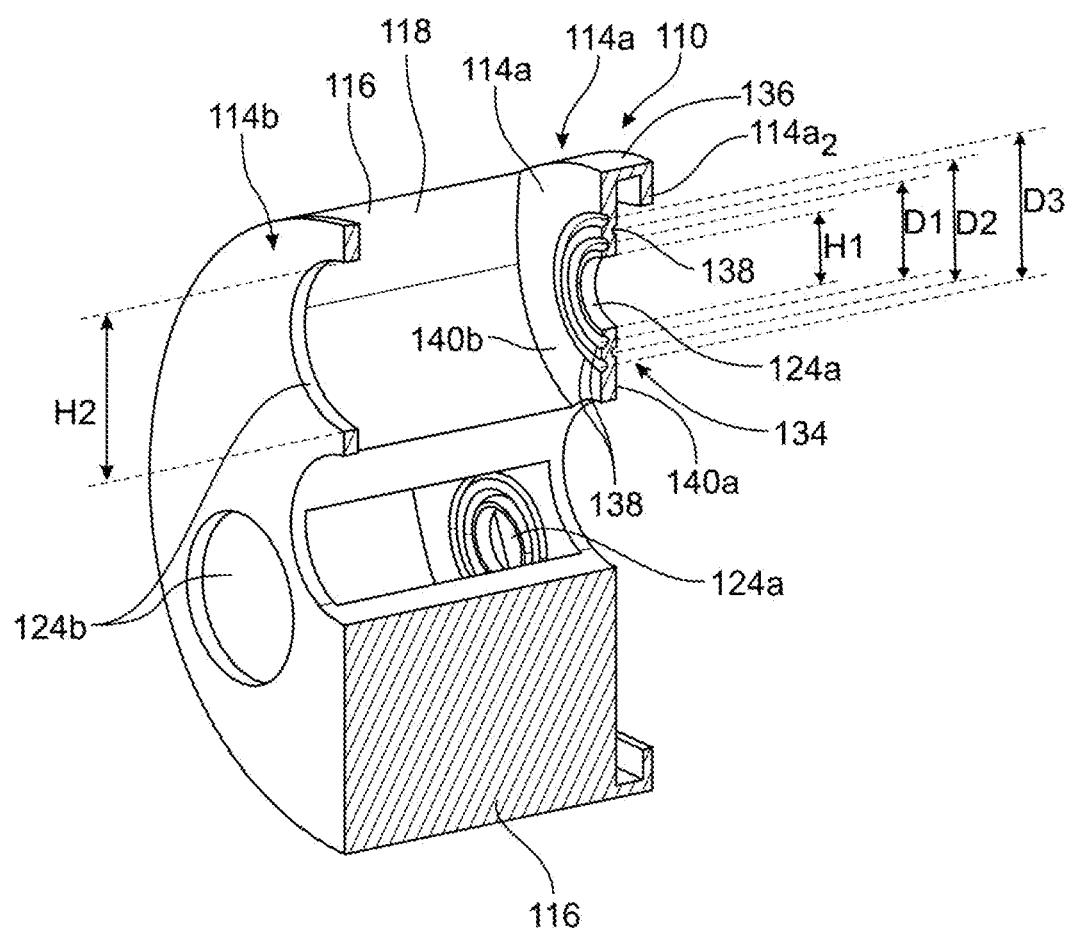
FIG. 6 is an axial cross-section and perspective view of a planet carrier according to an alternative embodiment of the disclosure.

FIG. 6 illustrates a variant of embodiment of the planet carrier 110, in which the flask 114a is equipped with three thinning gorges.

One of the faces of the wall 114a1, in this case the face 140b, comprises two gorges 138 which extend around each other and have diameters D1 and D3 respectively, and the other face 140a comprises a gorge 138 having a diameter D2 between D1 and D3.

In this variant, the orifices 124a, 124b of the flasks have different diameters H1, H2. In particular, the orifices 124a of the first flask 114a each have an internal diameter H1 which is smaller than the internal diameter H2 of each of the orifices 124b of the second flask 114b.

This allows to stiffen the edge of the orifice 124b opposite the flexibility to increase its stiffness and to favour a small diameter for the orifice 124a in order to maximise the machinable area for the gorges 138.

Figure 7A:
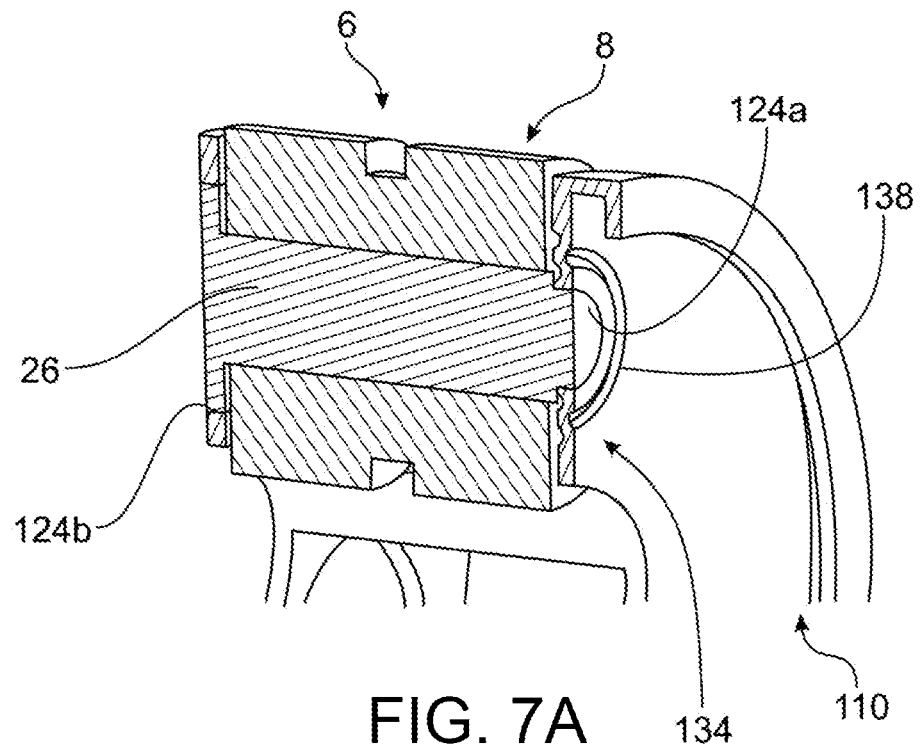
FIGS. 7a and 7b are similar views to FIG. 6 and show the planet carrier of FIG. 6 associated with a single-stage planet gear and a double-stage planet gear respectively.
Figure 7B:
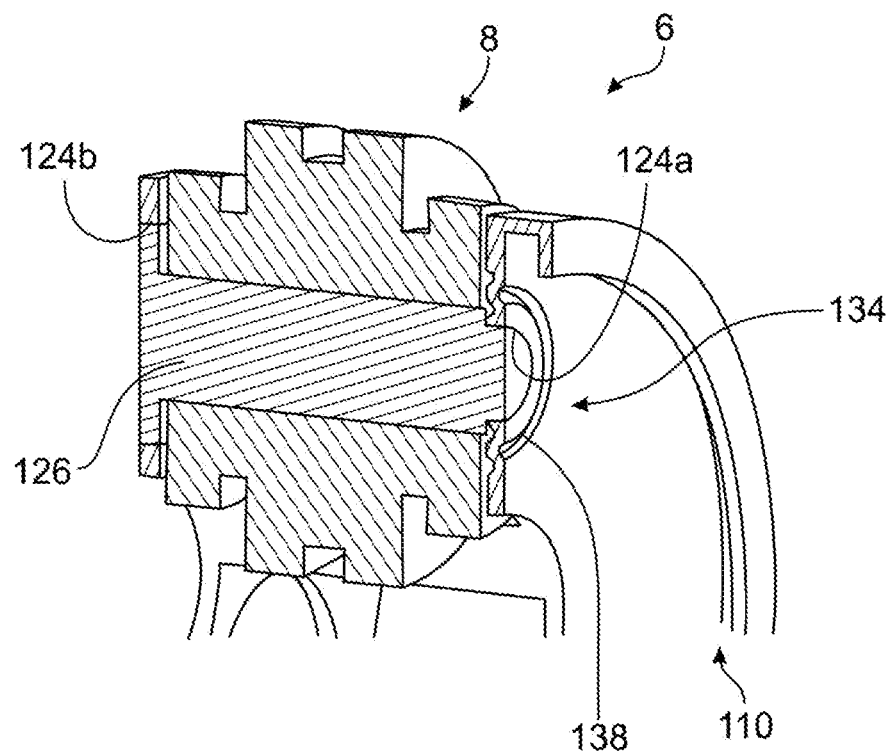

FIGS. 7a and 7b show that the planet carrier 110 according to the disclosure, whatever its embodiment, can be associated with single- or double-stage planet gears 8.

The embodiments of the present disclosure include the following features, among others:
 a solution that is easy to implement in a confined space;
 measurable and configurable gains in flexibility;
 improving the centrability of the forces on a monobloc planet carrier.

In the foregoing description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 10% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

It should be noted that for purposes of this disclosure, terminology such as "upper," "lower," "vertical," "horizontal," "fore," "aft," "inner," "outer," "front," "rear," etc., should be construed as descriptive and not limiting the scope of the claimed subject matter. Further, the use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings.

Throughout this specification, terms of art may be used. These terms are to take on their ordinary meaning in the art from which they come, unless specifically defined herein or the context of their use would clearly suggest otherwise.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A planet carrier for a mechanical gearbox of a turbomachine for an aircraft, the planet carrier comprising: a main axis; a cage formed in a single piece, the cage including: a shaft portion centered on the main axis; first and second annular flasks extending around the main axis, the first flask being operably coupled to the shaft portion, and the second flask being operably coupled to the first flask by bridges of material distributed around the main axis, the bridges of material defining between them and with the first and second annular flasks; and housings configured to receive planet gears, the first and second flasks comprising, respectively, a plurality of first and second orifices for mounting the planet gears, each of which are oriented axially and which open into the housings, wherein the first flask comprises a thinning around each of the plurality of first orifices, the thinning defining a minimum thickness of material in the axial direction which is less than a minimum thickness of the second flask around each of the plurality of second orifices, wherein the thinning comprises two or three coaxial gorges extending around each of the plurality of first orifices, wherein the two or three coaxial gorges comprise an innermost coaxial gorge which extends directly about an inner peripheral edge of each first orifice and which is open towards the housing.

2. The planet carrier of claim 1, wherein the first flask comprises a first face located on the side of the shaft portion, and a second face located on the side of the second flask, and wherein at least the first face and/or the second face include at least one gorge.

3. The planet carrier of claim 2, wherein the gorges formed on the first face and/or the second face have different diameters.

4. The planet carrier of claim 2, wherein one of the first and second faces comprises two gorges which extend around each other and have first and second diameters respectively, and the other of the first and second faces comprises a gorge having a third diameter between the first and second diameters.

5. The planet carrier of claim 1, wherein each gorge has a generally curved or semi-circular cross-sectional shape.

6. The planet carrier of claim 1, wherein the thinning reduces a thickness of the first flask by at least 50%.

7. The planet carrier of claim 1, wherein each of the plurality of first orifices has an internal diameter which is smaller than the internal diameter of each of the plurality of second orifices.

8. The planet carrier of claim 1, wherein the first flask is double-walled and comprises a first wall and a second wall parallel to the first wall, the first and second walls being connected together by an annular web at a level of their external peripheries, the first wall being connected by the material bridges to the second flask and comprising the at least one thinning, and the second wall being connected to the shaft portion.

9. The planet carrier of claim 1, wherein the shaft portion comprises an external toothing.

10. A mechanical gearbox for an aircraft turbomachine, the gearbox comprising:
 a planet carrier according to claim 1;
 planet gears which are housed in the housings and which are guided by bearings whose axial ends are engaged in the first and second orifices; and
 a sun gear which is housed in the cage and which is meshed with the planet gears.

11. An aircraft turbomachine, comprising a planet carrier according to claim 1.

12. An aircraft turbomachine, comprising a gearbox according to claim 10.

13. A planet carrier for a mechanical gearbox of a turbomachine for an aircraft, the planet carrier comprising:
 a main axis; and
 a cage formed in a single piece, the cage including:
  a shaft portion centered on the main axis;
  first and second annular flasks extending around the main axis, the first flask being operably coupled to the shaft portion, and the second flask being operably coupled to the first flask by bridges of material distributed around the main axis, the bridges of material defining between them and with the first and second annular flasks; and
  housings configured to receive planet gears, the first and second flasks comprising, respectively, a plurality of first and second orifices for mounting the planet gears, each of which are oriented axially and which open into the housings,
 wherein the first flask comprises a thinning around each of the plurality of first orifices, the thinning defining a minimum thickness of material in the axial direction which is less than a minimum thickness of the second flask around each of the plurality of second orifices, and
 wherein the thinning comprises two or three coaxial gorges extending around each of the plurality of first orifices, and
 wherein the first flask is double-walled and comprises a first wall and a second wall parallel to the first wall, the first and second walls being connected together by an annular web at a level of their external peripheries, the first wall being connected by the material bridges to the second flask and having the at least one thinning, and the second wall being connected to the shaft portion.

14. The planet carrier of claim 13, wherein the two or three coaxial gorges comprise an innermost coaxial gorge which extends directly about an inner peripheral edge of each first orifice and which is open towards the housing.

15. A planet carrier for a mechanical gearbox of a turbomachine for an aircraft, the planet carrier comprising: a main axis; a cage formed in a single piece, the cage including: a shaft portion centered on the main axis; first and second annular flasks extending around the main axis, the first flask being operably coupled to the shaft portion, and the second flask being operably coupled to the first flask by bridges of material distributed around the main axis, the bridges of material defining between them and with the first and second annular flasks; and housings configured to receive planet gears, the first and second flasks comprising, respectively, a plurality of first and second orifices for mounting the planet gears, each of which are oriented axially and which open into the housings, wherein the first flask comprises a thinning around each of the plurality of first orifices, the thinning defining a minimum thickness of material in the axial direction which is less than a minimum thickness of the second flask around each of the plurality of second orifices, wherein the thinning comprises two or three coaxial gorges extending around each of the plurality of first orifices, and wherein each of the plurality of first orifices has an internal diameter which is smaller than an internal diameter of each of the plurality of second orifices.

\* \* \* \* \*